(12) United States Patent
Beaver et al.

(10) Patent No.: US 12,205,368 B2
(45) Date of Patent: Jan. 21, 2025

(54) AGGREGATE TRAIT ESTIMATION FOR AGRICULTURAL PLOTS

(71) Applicant: Deere & Company, Moline, IL (US)

(72) Inventors: Zachary Beaver, San Francisco, CA (US); Ming Zheng, Redwood City, CA (US); Chuan Du, Vancouver (CA); Tiffany Cai, Palo Alto, CA (US)

(73) Assignee: Deere &Company, Moline, IL (US)

( * ) Notice: Subject to any disclaimer, the term of this patent is extended or adjusted under 35 U.S.C. 154(b) by 277 days.

(21) Appl. No.: 17/681,062

(22) Filed: Feb. 25, 2022

(65) Prior Publication Data
US 2023/0274541 A1 Aug. 31, 2023

(51) Int. Cl.
| | | |
|---|---|---|
| *G06V 20/68* | (2022.01) | |
| *A01B 79/00* | (2006.01) | |
| *G06V 10/44* | (2022.01) | |
| *G06V 20/10* | (2022.01) | |

(52) U.S. Cl.
CPC .......... *G06V 20/188* (2022.01); *A01B 79/005* (2013.01); *G06V 10/44* (2022.01); *G06V 20/68* (2022.01)

(58) Field of Classification Search
CPC .................................................. G06V 20/188
See application file for complete search history.

(56) References Cited

U.S. PATENT DOCUMENTS

| | | | |
|---|---|---|---|
| 5,897,619 A | 4/1999 | Hargrove et al. | |
| 10,251,347 B2 | 4/2019 | Xu et al. | |
| 11,062,223 B2 | 7/2021 | Xu et al. | |
| 11,100,641 B1 * | 8/2021 | Malahe | A01G 7/00 |
| 2005/0192760 A1 | 9/2005 | Dunlap | |

(Continued)

FOREIGN PATENT DOCUMENTS

| | | |
|---|---|---|
| JP | 2003006612 | 1/2003 |
| WO | 2021050928 | 3/2021 |

OTHER PUBLICATIONS

Qiao et al., "Exploiting Hierarchical Features for Crop Yield Prediction Based on 3-D Convolutional Neural Networks and Multikernal Gaussian Process" IEE Journal of Selected Topics in Applied Earth Observations and Remove Sensing, vol. 14, 2021. 14 pages.

(Continued)

*Primary Examiner* — Oneal R Mistry
(74) *Attorney, Agent, or Firm* — HANLEY, FLIGHT & ZIMMERMAN, LLC (57) ABSTRACT

Implementations are described herein for estimating aggregate trait values for agricultural plots. In various implementations, a plurality of images depicting crops in an agricultural plot may be processed using a feature extraction portion of aggregate trait estimation model to generate a corresponding plurality of embeddings. The plurality of embeddings may be combined to obtain a unified representation of the crops in the agricultural plot. Using a prediction portion of the aggregate trait estimation model, the unified representation of the crops may be processed to estimate, as a direct output of the aggregate trait estimation model, an aggregate trait value of the crops in the agricultural plot. Data indicative of the estimated aggregate trait value of the crops in the agricultural plot may be output at a computing device.

20 Claims, 6 Drawing Sheets

(56) References Cited

U.S. PATENT DOCUMENTS

| | | | |
|---|---|---|---|
| 2017/0251589 A1 | 9/2017 | Tippery et al. | |
| 2018/0025480 A1 | 1/2018 | Dingle et al. | |
| 2018/0137357 A1 | 5/2018 | Margalit et al. | |
| 2018/0189564 A1 | 7/2018 | Freitag et al. | |
| 2018/0211156 A1 | 7/2018 | Guan et al. | |
| 2018/0293671 A1* | 10/2018 | Murr | G06Q 50/02 |
| 2018/0308229 A1* | 10/2018 | Winkler | G06V 20/56 |
| 2019/0179009 A1* | 6/2019 | Klein | G01S 13/9023 |
| 2020/0242749 A1* | 7/2020 | Hearst | G06V 20/17 |
| 2021/0042523 A1* | 2/2021 | Rozenstein | G06T 7/0012 |
| 2021/0158041 A1* | 5/2021 | Chowdhary | G05D 1/0272 |
| 2021/0287001 A1* | 9/2021 | Meltzer | G06V 10/806 |
| 2022/0030763 A1 | 2/2022 | Morrison | |
| 2023/0100004 A1* | 3/2023 | Brauer | G06T 7/11 382/110 |

OTHER PUBLICATIONS

Hemming et al., "Fruit Detectability Analysis for Different Camera Positions in Sweet-Pepper" Sensors 2014, 14, 6032-6044; doi: 10.339/s140406032. 13 pages.

Darwin et al., "Recognition of Bloom/Yield in Crop Images Using Deep Learning Models for Smart Agriculture: A Review" Agronomy 2021, 11, 646. doi.org/10.3390/agronomy11040646. 22 pages.

Ferencz et al., "Crop yield estimation by satellite remote sensing" Int. J. Remote Sensing, Oct. 20, 2004, vol. 25, No. 20, 4113-4149. 38 pages.

Lee, W.S.; Citrus Yield Mapping System in Natural Outdoor Scenes using the Watershed Transform; dated Jul. 2006.

Calafell, Davinia; Application of image processing methodologies for fruit detection and analysis; Universitat de Lleida; 86 pages;; dated Jul. 2014.

Climate Fieldview—Yield Analysis; Video retrieved from https://www.youtube.com/watch?v=G6M-YGolxeA; dated Nov. 1, 2017.

Google Glass—New Tool for Ag; Video retrieved from https://www.youtube.com/watch?v=drypBC4bzLg; dated Oct. 31, 2014.

Grassi, Mathew; Google Glass: New Tool For Ag; retrieved from https://www.croplife.com/precision/google-glass- new-tool-or-toy-for-ag/; dated Oct. 8, 2014.

Klompenburg, Thomas et al.; Crop yield prediction using machine learning: A systematic literature review; Computers and Electronics in Agriculture; 18 pages; dated 2020.

Han, J. et al., "Real-time detection of rice phenology through convolutional neural network using handheld camera images"; Precision Agriculture, vol. 22, No. 1; pp. 154-178; dated Jun. 28, 2020.

European Patent Office; International Search Report and Written Opinion issued in Application No. PCT/US2022/050734; 10 pages; dated Mar. 28, 2023.

* cited by examiner

AGGREGATE TRAIT ESTIMATION FOR AGRICULTURAL PLOTS

BACKGROUND

Estimation of crop yield and other aggregate traits of agricultural plots is often performed by first processing images depicting crops to detect interpretable traits. These detected interpretable traits can then be used as intermediate data points to estimate the aggregate traits that are the ultimate goal. For example, a soybean yield may be estimated by processing images of the soybeans to detect soy bean pods. The detected soy bean pods may then be used to estimate the soybean yield. However, at least some human labeling of these interpretable traits is typically required in order to train a machine learning model to detect them. Human labeling increases time and costs associated with developing the machine learning model. Moreover, a model trained to detect interpretable traits of particular crops may not be readily scalable to other similar crops, and may fail to take adequate advantage of other latent visual features, unrelated to the interpretable trait, that nonetheless may be predictive of aggregate traits such as crop yield.

SUMMARY

Implementations are described herein for estimating aggregate trait values for agricultural plots. More particularly, but not exclusively, implementations are described herein for processing images of crops in an agricultural plot using "aggregate trait estimation" machine learning models to directly estimate the aggregate trait values, without the explicit use of human-defined and/or interpretable intermediate traits. Many examples described herein will refer to estimating or predicting crop yield, but "aggregate trait values" are not so limited. Additionally, in various implementations, a given aggregate trait estimation model may be trained to make predictions for agricultural plots.

In various implementations, a method may be implemented using one or more processors and may include: processing, using a feature extraction portion of aggregate trait estimation model, a plurality of images depicting crops in an agricultural plot to generate a corresponding plurality of embeddings; combining the plurality of embeddings to obtain a unified representation of the crops in the agricultural plot; processing, using a prediction portion of the aggregate trait estimation model, the unified representation of the crops to estimate, as a direct output of the aggregate trait estimation model, an aggregate trait value of the crops in the agricultural plot; and causing data indicative of the estimated aggregate trait value of the crops in the agricultural plot to be output at a computing device.

In various implementations, the method may include capturing the plurality of images as a first plurality of images using a first vision sensor carried across the agricultural plot by an agricultural vehicle. In various implementations, the method may include capturing a second plurality of images using a second vision sensor carried across the agricultural plot by the agricultural vehicle, wherein the first vision sensor captures the crops from a first angle and the second vision sensor captures the crops from a second angle that is different than the first angle. In various implementations, the first angle may be a side view of the crops and the second angle comprises a top-down view of the crops.

In various implementations, the aggregate trait value may be a first aggregate trait value, the aggregate trait estimation model may include a first aggregate trait estimation model, and the method may further include: processing, using a feature extraction portion of a second aggregate trait estimation model, the second plurality of images to generate a corresponding second plurality of embeddings; combining the second plurality of embeddings to obtain a second unified representation of the crops in the agricultural plot; and processing, using a prediction portion of the second aggregate trait estimation model, the second unified representation of the crops to estimate, as a direct output of the second aggregate trait estimation model, a second aggregate trait value of the crops in the agricultural plot. In various implementations, the method may include calculating a final aggregate trait value of the crops in the agricultural plot based on the first and second aggregate trait values.

In various implementations, the combining may include concatenating or averaging the plurality of embeddings. In various implementations, the estimated aggregate trait value may be a probability within a normalized range that corresponds to non-normalized, ground truth aggregate trait values observed in the field.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to enable performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for estimating aggregate trait values for agricultural plots. More particularly, but not exclusively, implementations are described herein for processing images of crops in an agricultural plot using "aggregate trait estimation" machine learning models to directly estimate the aggregate trait values, without the explicit use of human-defined and/or interpretable intermediate traits. Many examples described herein will refer to estimating or predicting crop yield, but "aggregate trait values" are not so limited. Additionally, in various implementations, a given aggregate trait estimation model may be trained to make predictions for agricultural plots.

In various implementations, images of crops in a plot may be captured by one or more vision sensors. For example, one or more cameras may be mounted to an agricultural vehicle such as a tractor, rover, unmanned aerial vehicle (UAV), and so forth. Control of these agricultural vehicles may range between complete human control to near-absolute autonomy. In some implementations, multiple vision sensors may be deployed at different locations on the vehicle relative to the crops to acquire images of the crops from different angles. For example, one camera may capture top-down images of the crops, another camera may capture side views of the crops, and so forth. In some implementations, placement of these vision sensors may be determined based on the crops being photographed. If, for a particular crop, the plant trait-of-interest (e.g., a flower, fruit, nut, pod, etc.) is best viewed from a particular angle (e.g., above, from the side, from below, etc.), then at least one vision sensor may be placed to capture crops from that angle.

In various implementations, the images of the plot's crops captured by these vision sensors may be processed using a feature extraction portion of an aggregate trait estimation model to generate a plurality of image embeddings (alternatively referred to as feature vectors). Unlike conventional techniques for predicting crop yield, a feature extraction portion of an aggregate trait estimation model configured with selected aspects of the present disclosure may not be trained explicitly to directly detect (e.g., for annotation and/or segmentation) human-interpretable traits, particularly plant-parts-of-interest such as pods, flowers, fruit, etc. Instead, the feature extraction portion may be trained to extract whatever visual features, latent or otherwise, that are most predictive of the targeted aggregate plant trait. This could include interpretable features such as plant-parts-of-interest (e.g., fruits, pods), but it's not required.

These image embeddings may then be combined into a unified representation (e.g., an embedding or feature vector) of the crops in the agricultural plot. The embeddings may be combined into such a unified representation in various ways, such as concatenation, averaging, etc. The unified representation may then be processed using a prediction portion of the aggregate trait estimation model to estimate an aggregate trait value of the crops in the agricultural plot. This estimated aggregate trait value may be generated as direct output of the aggregate trait estimation model (e.g., as output of a layer of the model). This is in contrast to conventional crop yield estimation, where measured values of interpretable plant-parts-of-interest (e.g., pod count, height, etc.) first may be estimated using a machine learning model, and then the measured values may be used as an operand of a mathematical function to estimate crop yield.

The aggregate trait estimation model may take various forms. In some implementations, all or a portion of the model, such as the feature extraction portion, may take the form of a convolutional neural network (CNN). However, this is not required. In other implementations, a sequence-to-sequence model such a recurrent neural network (RNN), long short-term memory (LSTM) network, gated recurrent unit (GRU) network, and/or a Bidirectional Encoder Representations from Transformers (BERT) transformer network, may be used to process individual pixels or groups of pixels as a sequence, e.g., by scanning rows or columns of the images. Whether a CNN or sequence-to-sequence model is employed as the feature extraction portion, the result may be a semantically-rich embedding (or feature vector) that represents latent visual features of the images.

In some implementations where multiple sets of images are captured from multiple angles, multiple aggregate trait estimation models may be trained separately to generate multiple different aggregate trait value estimates, with each model trained using images captured from a different angle. For example, one aggregate trait estimation model may be trained using side-view images, another may be trained using top-down-view images, and so on. In some implementations, the resulting multiple aggregate trait value estimates may then be used to calculate a final aggregate trait value estimate, e.g., as an average, median, weighted average, etc.

Some aggregate traits such as crop yield may vary widely between plots, even plots having the same type of plants growing. This high variation of yield from plot to plot can lead difficulty in training, etc. Accordingly, in some implementations, images are sampled uniformly across different plots (even plots of different sizes) to obtain a robust visual representation of each plot. In some implementations, each training example may take the form of a uniform number of images representing a respective plot. For example, if plot A is five meters long and plot B is ten meters long, ten images may be uniformly sampled in each of plots A and B. In other words, plots that vary in length and/or size may be sampled using the same number of images, allowing the aggregate trait estimation model to produce a crop yield for plots that are not all the same length.

In some implementations, instead of directly outputting an estimated aggregate trait such as crop yield, in some implementations, the estimated aggregate trait generated based on the aggregate trait model may take other forms. For example, in some implementations, the estimated aggregate trait value may be converted (e.g., using a softmax layer) to a probability within a normalized range, e.g., zero to one, which corresponds to actual observed aggregate traits among populations of agricultural plots. In some implementations, this normalized range may be determined by normalizing ground truth aggregate trait values observed in the field. For example, for a particular type of crop, ground truth crop yield from agricultural plots may be anywhere from zero (e.g., bare dirt) to a maximum observed yield such as 2,000 kg/ha. This range may be normalized to a range of probabilities, 0 to 1.

Normalizing the model's output in this way may allow for the aggregate trait estimation model to be trained as a classifier (e.g., a binary classifier), rather than a regression model. For example, rather than determining a precise error between an estimated crop yield and an actual crop yield, and using that error to train the model, the estimated crop yield may be converted to a probability using a softmax layer. In some implementations, this probability in the normalized range may be classified into one of two (or more) artificial classes (or "bins"), e.g., one class called "yield" and another called "non-yield." The probability of being a member of a particular one of these classes may then be compared to a normalized ground truth probability of being a member of the particular class that is calculated from the actual ground truth crop yield. In some such implementations, the model may be trained based on the difference between these probabilities. In some implementations, the probability may be transformed back to the true crop yield (e.g. 2,000 kg/ha). In various implementations, an area under the curve (AUC) strategy may be employed to determine when training of the aggregate trait estimation model should be terminated to avoid overfitting and leave the model as generalizable as possible.

Figure 1:
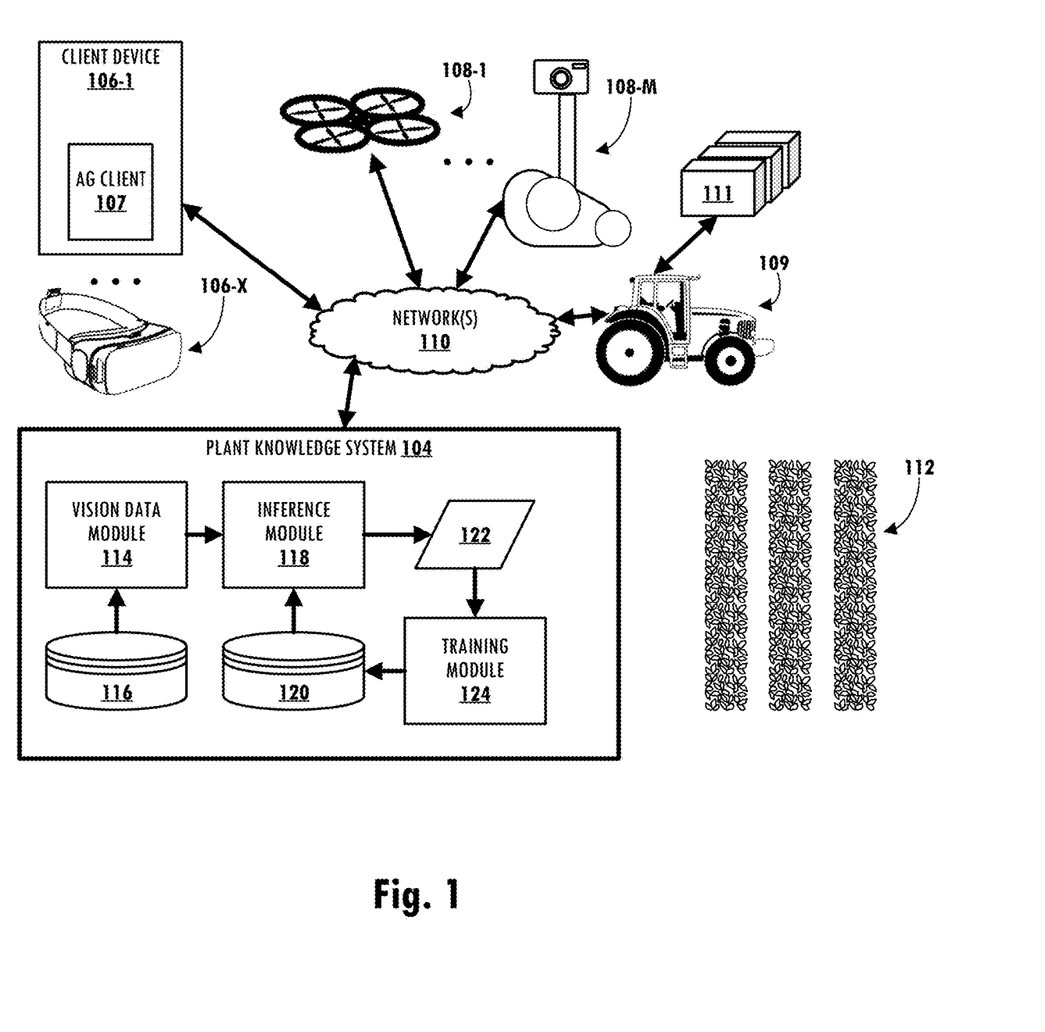
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural plots 112 and various sensors that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural plots(s) 112 may be used to grow various types of crops that may produce plant parts of economic and/or nutritional interest. Agricultural plots(s) 112 may have various shapes and/or sizes. In the United States, for instance, it is common to organize a larger field into smaller plots, each with two rows. In various implementations, aggregate trait estimation models may be applied on a plot-by-plot basis to estimate aggregate trait values for individual plots.

In some instances, different plots of the same size may be used to grow similar plants, except with minor differences. For example, one plot may be used to grow drought-resistant soybeans. Another plot may be used to grow cold-tolerant soybeans. Another plot may be used to grow pest-resistant soybeans. And so forth. Training aggregate trait estimation models as described herein using probabilities allow for these models to be useful to predict aggregate traits for these variations of otherwise similar plants.

An individual (which in the current context may also be referred to as a "user" or "grower") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device 106x may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, one or more robots 108-1 to 108-M and/or other agricultural vehicles 109 may be deployed and/or operated to perform various agricultural tasks. These tasks may include, for instance, harvesting, irrigating, fertilizing, chemical application, trimming, pruning, sucker/bud removal, etc. An individual robot $108_{1-M}$ may take various forms, such as an unmanned aerial vehicle 108-1, a robot (not depicted) that is propelled along a wire, track, rail or other similar component that passes over and/or between crops, a wheeled robot 108-M, a rover that straddles a row of plants (e.g., so that the plant pass underneath the rover), or any other form of robot capable of being propelled or propelling itself past crops of interest.

In some implementations, different robots may have different roles, e.g., depending on their capabilities. For example, in some implementations, one or more of robots 108-1 to 108-M may be designed to capture various types of sensor data (e.g., vision, temperature, moisture, soil characteristics), others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, soil sensors, etc.

In addition to or instead of robots, in some implementations, agricultural vehicles 109 such as the tractor depicted in FIG. 1, center pivots, boom sprayers (which may be affixed to tractors or other agricultural vehicles), threshers, etc. may be leveraged to acquire image data. For example, one or more modular computing devices 111 (also referred to as "sensor packages") may be mounted to agricultural vehicle 109 and may be equipped with any number of sensors, such as one or more vision sensors that capture images of crops, or other sensors such as soil sensors, moisture sensors, thermometers, etc. These sensor data may be processed using machine learning models described herein to estimate aggregate traits of agricultural plots 112, such as crop yield.

In various implementations, plant knowledge system 104 may be implemented across one or more computing systems that may be referred to as the "cloud". Plant knowledge system 104 may receive vision data generated by robots 108-1 to 108-M, modular computing devices 111, and/or agricultural personnel and process it using various image processing techniques to perform tasks such as estimating aggregate traits 122 on a plot-by-plot basis. In various implementations, plant knowledge system 104 may include a vision data module 114, an inference module 118, and a training module 124. In some implementations one or more of modules 114, 118, 124 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel, modular computing device(s) 111, and/or one or more robots 108-1 to 108-M. Plant knowledge system 104 may also include a machine learning model database 120 that includes one or more machine learning models that are trained as described herein to detect diseased plants and/or plant disease. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as modular computing device(s) 111 and/or robots 108-1 to 108-M. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to process imagery received from vision data module 114 using various machine learning models stored in machine learning model database 120 to generate output. This output may be indicative of various information, such as phenotypic traits, estimated aggregate traits of plots, and so forth. Various types of machine learning models may be trained for use in performing selected aspects of the present disclosure. For example, a feature extraction portion of an aggregate trait estimation model (not depicted in FIG. 1, see FIGS. 2-4) may be trained to generate, as output, semantically-rich feature embeddings that represent images captured of crops in plot 112. Such a feature extraction portion may take various forms, including but not limited to a CNN, BERT transformer, LSTM, RNN, GRU, etc. Additionally, in some implementations, the aggregate trait estimation model may also include a prediction portion (not shown in FIG. 1, see FIG. 3) that is trained to generate, based on one or more input embeddings such as those generated by the feature extraction portion, an estimation of an aggregate trait of agricultural plot.

During a training phase, training module 124 may be configured to train the aforementioned aggregate trait estimation model (or portions thereof) using ground truth and/or observed aggregate plot traits. For example, a particular agricultural plot 112 may yield 1,000 units of a plant-trait-of-interest. Images of crops in that particular agricultural plot, captured sometime in the crop cycle prior to harvest, may be processed using the aggregate trait estimation model to predict crop yield. This predicted crop yield may then be compared, e.g., by training module 124, to the ground truth crop yield to determine an error. Based on this error, training module 124 may train one or more of the machine learning models in database 120, e.g., using techniques such as back propagation and gradient descent.

Figure 2:
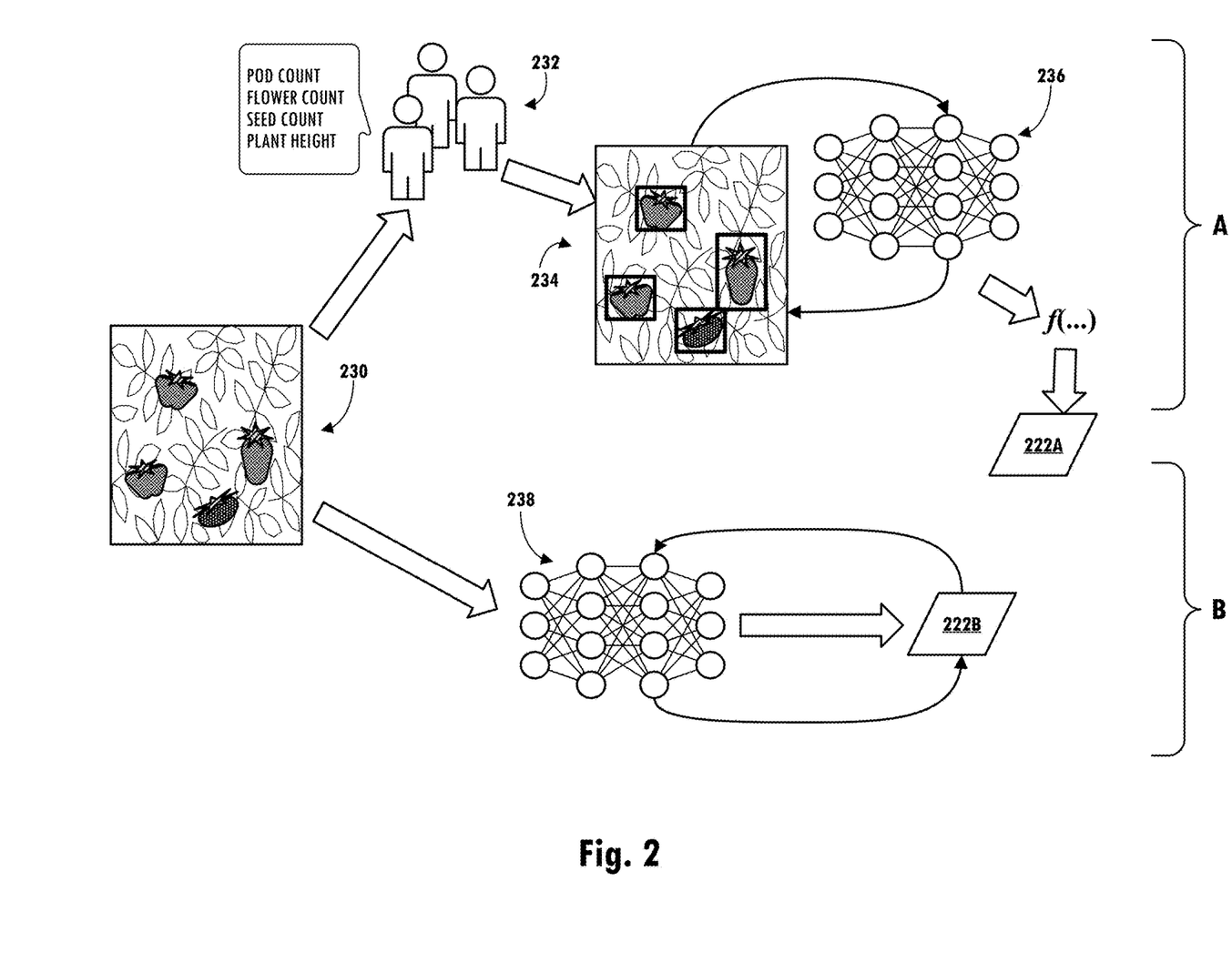
FIG. 2 schematically depicts two techniques for training machine learning models to estimate aggregate traits for agricultural plots, in accordance with various implementations.

FIG. 2 schematically depicts two examples of how machine learning models may be trained to predict aggregate traits of agricultural plots, such as crop yield. At left is an image 230 of a plant that includes four plant-parts-of-interest (strawberries in this example). Across the top of FIG. 2, in a portion labeled "A" at right, is depicted one way of training a machine learning model 236 to predict crop yield from images such as image 230. Image 230 and/or others like it may be analyzed, examined, and/or evaluated by personnel 232, who may be data scientists, agricultural experts, botanists, or any other party with expertise and/or knowledge about the depicted plants. As shown in the balloon at top left, these personnel 232 may select interpretable plant traits that they deem predictive of the ultimate desired aggregate trait. Here, personnel 232 may consider traits such as pod count, flower count, seed count, or plant height as being predictive of crop yield. For instance, the number of observed pod counts would, at least intuitively, be predictive of the number of beans or peas yielded by those pods.

Once interpretable plant traits-of-interest are selected, personnel 232 and/or others may label images such as image 230 with metadata such as annotations that identify the interpretable traits-of-interest. For example, in FIG. 2, an annotated image 234 includes bounding boxes around all detected strawberries. These manual annotations may then be used as ground truth training data for training of machine learning model 236. Machine learning model 236 may take various forms, such as a CNN. By repeatedly training machine learning model 236 using these ground truth annotations, machine learning model 236 eventually may be usable to predict similar annotations for unlabeled images. These predicted annotations may be processed according to some mathematical function $f( \ldots )$ that maps the annotations to actual predicted crop yield 222A. As an example, the number of detected strawberries may be multiplied by an average weight of the detected strawberries to estimate a crop yield.

The training process referenced by the letter "A" may have various drawbacks. Involving personnel 232 in the training process adds costs and/or delays. For example, manually-labeling training data may be cost-prohibitive, cumbersome, and/or may take an inordinate amount of time. Moreover, the extra models and/or model layers that would be implemented in process A may introduce additional sources of error and/or components to debug. Moreover, the ability of the whole pipeline "A" to predict crop yield may be overly dependent on the interpretable traits-of-interest, and may not sufficiently consider other latent features of image 230. For example, interpretable traits-of-interest that are occluded by foliage may be, at best, interpolated from the visible interpretable traits-of-interest.

The bottom processing pipeline referenced by the letter "B" may overcome and/or avoid some of these drawbacks. In pipeline "B," image 230 may be processed using an aggregate trait estimation model 238 in order to predict a crop yield 222B. Unlike pipeline "A," there is no labeling of interpretable traits-of-interest in pipeline "B." Instead, aggregate trait estimation model 238 is trained, e.g., by training module 124, to map image 230 (and others like it depicting crops in the same plot) directly to a predicted crop yield, without explicit consideration of interpretable traits-of-interest.

By employing pipeline "B," the costs associated with personnel 232 both deciding/selecting interpretable traits that they deem most predictive and labeling training data may be largely, if not completely, avoided. Moreover, aggregate trait estimation model 238 may be more scalable to slightly different varieties of crops (e.g., drought-resistance soybeans versus pest-resistant soybeans, the same type of crops grown in different years, etc.) than machine learning model 236, which may be over-fitted to particular interpretable traits-of-interest. In addition, aggregate trait estimation model 238 may better capture latent features that are most predictive of crop yield, regardless of whether those features correspond to interpretable traits-of-interest typically considered by humans or to other latent traits that would not necessarily be as perceptible by humans.

In some implementations, a combination of pipelines A and B may be employed, e.g., as a single model or an ensemble of models, to predict aggregate trait estimates. For example, the metadata (e.g., annotations of human-interpretable traits) generated using model 236 may be processed along with data generated by or within model 238 by an additional model (not depicted) or additional model layers to make a prediction that is based both on the metadata (pipeline A) and the raw imagery (pipeline B). Other data may be provided as inputs to such a model (or ensemble of models) as well, such as climate data (e.g., rainfall, temperature, humidity, sunlight), soil measurements, applied chemicals, applied irrigation, early season traits (e.g., flowers, buds, shoots, etc. that stand some chance of evolving into fruit), etc. Examples of using other data (e.g., metadata, climate, etc.) along with the raw imagery will be described below.

Figure 3:
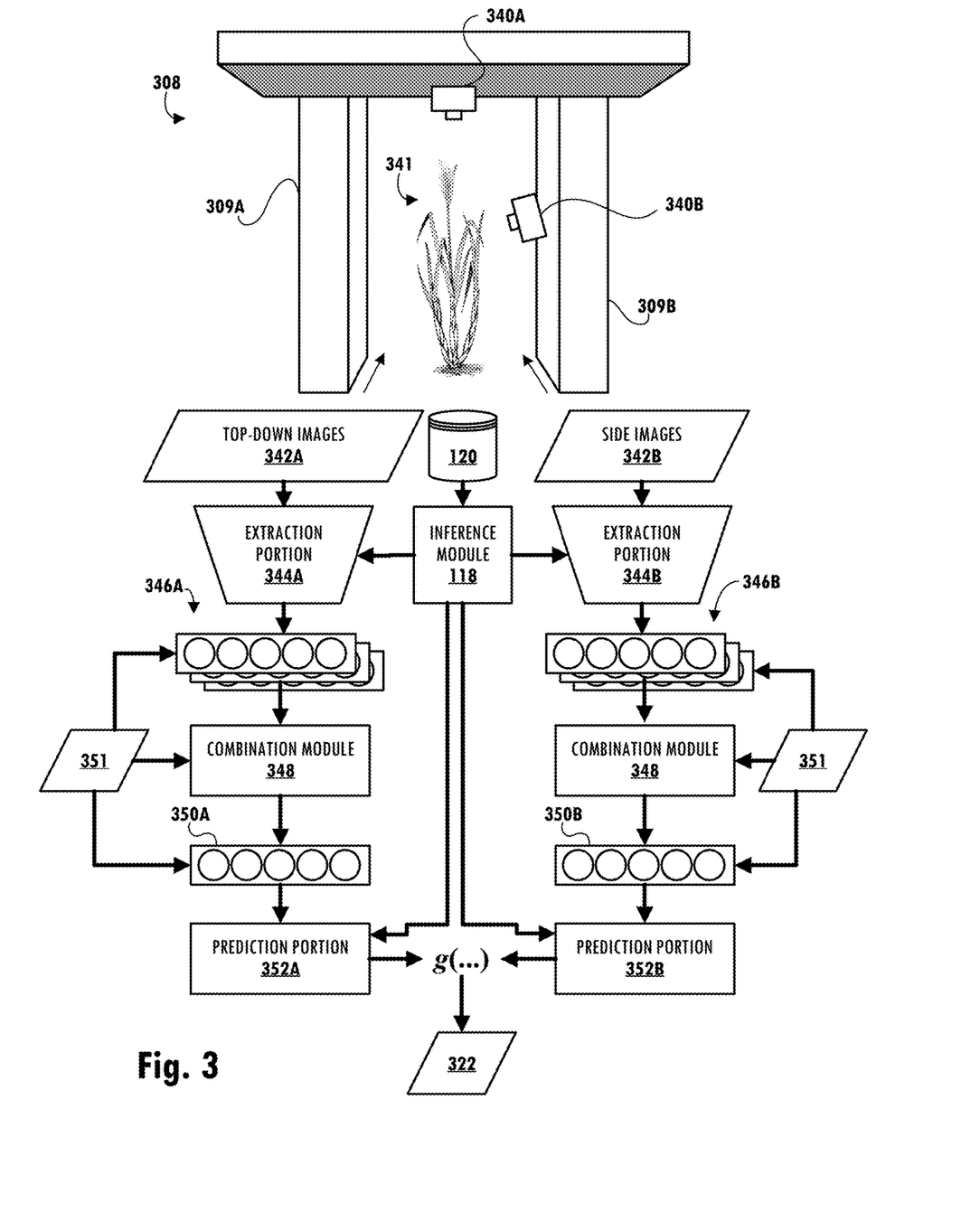
FIG. 3 schematically depicts an example of how images of crops acquired from multiple angles may be processed using techniques described herein to estimate aggregate traits for agricultural plots.

FIG. 3 schematically depicts an example of how images captured by multiple vision sensors 340A, 340B carried by a rover 308 through a plot may be processed to estimate an aggregate trait value 322 for the plot. Rover 308 may include two or more supports 309A, 309B that allow rover 308 to travel in a direction (indicated by the arrows in FIG. 3) parallel to a row of plants, such that supports 309A, 309B flank the row of plants (one plant 341 is depicted in FIG. 3). With rows of plants passing underneath, vision sensors 340A, 340B may capture images of those plants from different angles. In FIG. 3, first vision sensor 340A captures images of plant 341 from a top-down angle. Second vision sensor 340B captures images of plant 341 from the side, at a slight angle. In some implementations, additional vision sensors may be deployed from additional angles, and/or vision sensors 340A-B may be deployed at different respective angles. Each vision sensor 340 may take various forms, such as an RGB camera, infrared camera, a vision sensor with depth sensing capabilities (e.g., a 2.5D camera), a stereoscopic camera (which may include two separate lenses or one lens that is used to capture pairs of images), a light detection and ranging (LIDAR) sensor, and so forth.

In FIG. 3, two parallel image processing pipelines are shown, one on the left and one on the right. Starting on the left, top-down images 342A captured by first vision sensor 340A may be provided, e.g., by vision data module 114, to inference module 118. Inference module 118 may process top-down images 342A using an extraction portion 344A of a first aggregate trait estimation model (represented by 344A and 352A) stored in database 120. Extraction portion 344A of the first aggregate trait estimation model may take various forms, such as a CNN, transformer, LSTM, GRU, RNN, etc. (the same goes for a second aggregate trait estimation model represented by extraction portion 344B and prediction portion 352B on the right).

The output generated by inference module 118 based on extraction portion 344A of the first aggregate trait estimation model may take the form of a first plurality of embeddings 346A. In some implementations, each embedding of the first plurality of embeddings 346A may be generated from a respective top-down image of the plurality of top-down images 342A. Each embedding may have any number of dimensions, although they would typically have less dimensions than the original images (342A) from which they are generated.

A combination module 348, which may be implemented using any combination of hardware and software, may be configured to combine the first plurality of embeddings 346A into a first unified representation 350A of the crops in the agricultural plot. Combination module 348 may combine embeddings in various ways, such as via concatenation, averaging, etc. Because the underlying images 342A were top-down images, first unified representation 350A also represents the crops in the plot, and more particularly, any number of visual features (latent or otherwise) of those crops, from a top-down perspective. Inference module 118 may then process the first unified representation 350A based on a prediction portion 352A of the first aggregate trait estimation model stored in database 120.

In some implementations, inference module 118 may also use additional inputs 351 when making predictions. For example, additional inputs 351 may be applied during various stages, such as alongside the first plurality of embeddings 346A, or by combination module 348 when generating first unified representation 350A. These additional inputs 351 can include, for instance, the metadata (e.g., annotations) described previously with respect to pipeline A of FIG. 2. Additionally or alternatively, these additional inputs 351 may include (as time-series data, cumulative data, etc.) climate data, chemical application data, soil measurements, crop rotation data (e.g., a particular crop may generate more yield if planted as part of a predetermined sequence of crops), prior yields, tillage practice data, and so forth.

As a direct output of first prediction portion 352A of the first aggregate trait estimation model, an aggregate trait value of the crops in the agricultural plot may be estimated. For example, assuming extraction portion 344A and prediction portion 352A have been trained to predict crop yield, then inference module 118 may generate, as direct output of prediction portion 352A, a predicted crop yield. As noted previously, in some implementations, prediction portion 352A may include a softmax layer that predicts the estimated aggregate trait value as a normalized probability.

This crop yield predicted based on prediction portion 352A of the first aggregate trait estimation model is ultimately based on the top-down images 342A (and additional input 351, if used). Accordingly, any strengths or shortcomings of a crop yield predicted exclusively from top-down observations will be manifested in this prediction. To provide a more robust prediction that is not subject to any limitations of top-down views, a second pipeline is depicted at right to process side images 342B captured by second vision sensor 340B.

The second pipeline on the right largely mirrors the first pipeline on the left. Inference module 118 once again processes side images 342B using an extraction portion 344B. However, extraction portion 344B may be part of a second aggregate trait estimation model that is different from the first aggregate trait estimation model that included extraction portion 344A and prediction portion 352A. This second aggregate trait estimation model may be trained separately using side view images. Otherwise it may function similarly, and may take a similar form as the first aggregate trait estimation model.

Based on the processing of side images 342B using extraction portion 344B, inference module 118 may generate a plurality of embeddings 346B corresponding to the plurality of side view images 342B. Combination module 348 once again may combine these embeddings 346B into another unified representation 350B of the crops in the plot. However, this additional unified representation 350B represents the crops from the side, rather than from the top. Inference module 118 once again processes unified representation 350B using a prediction portion 352B of the second aggregate trait estimation model (344B plus 352B) to predict an estimated aggregate trait value. As was the case with prediction portion 352A, in some implementations, inference module 118 may also process additional inputs 351 at various stages of the second pipeline at right, as shown by the arrows.

Once aggregate trait values are estimated from both pipelines, they may be processed using a mathematical function g( . . . ) to calculate a final estimated aggregate trait value 322. While two pipelines are depicted in FIG. 3, this is not meant to be limiting. There may be as many pipelines as there are vision sensors capturing images from different angles. And as will be shown in FIG. 4, in some implementations, there may be a single pipeline that is used to process images from any number of different angles.

In some implementations, the mathematical function g( . . . ) may be an average, or a weighted average. For example, if top-down images 342A are able to capture more visual features than side images, e.g., because plant 341 is of a type that is less occluded by foliage when viewed from the top town, the aggregate trait value predicted by inference module 118 from the left pipeline may be weighted more heavily. As another example, inference module 118 may generate a confidence score for each estimated aggregate trait value generated based on a prediction portion 352. In yet another example, a confidence score may be generated based on image quality metrics calculated for the original images. In some such implementations, the estimated aggregate trait values may be weighted in proportion to the confidence scores, e.g., with an estimated aggregate trait value having a greater confidence score being weighted more heavily.

Figure 4:
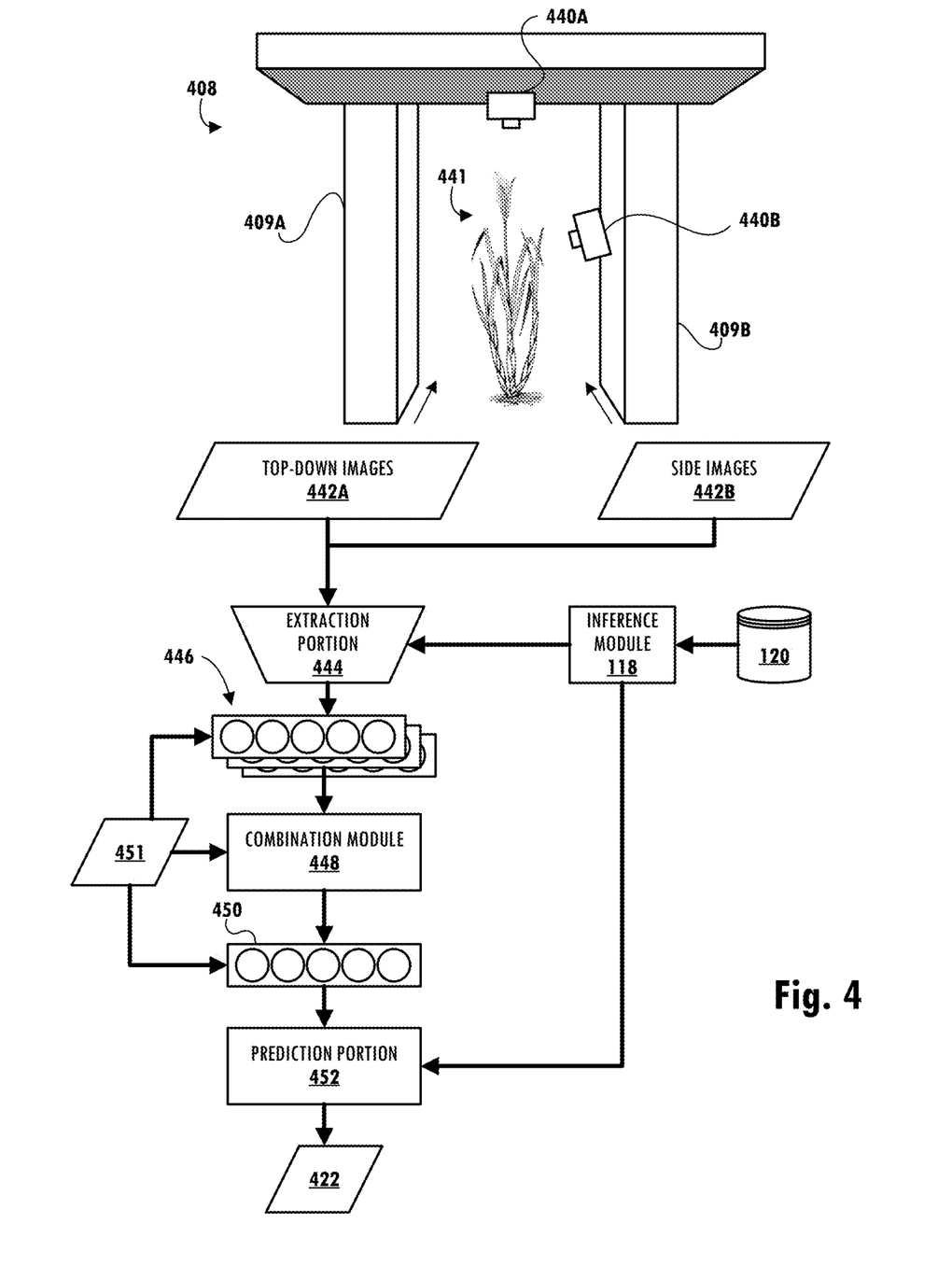
FIG. 4 schematically depicts another example of how images of crops acquired from multiple angles may be processed using techniques described herein to estimate aggregate traits for agricultural plots.

FIG. 4 schematically depicts another example of how images captured by multiple vision sensors 440A, 440B carried by a rover 408 through a plot may be processed to estimate an aggregate trait value 422 for the plot. FIG. 4 is similar to FIG. 3 in many respects; accordingly, similar reference numerals are used in FIG. 4 as were used in FIG. 3. However, in FIG. 4 there is only a single processing pipeline for both top-down images 442A and side view images 442B. Instead of being processed by separate aggregate trait estimation models as was depicted in FIG. 3, in FIG. 4, a single aggregate trait estimation model includes an extraction portion 444 and a prediction portion 452. As was the case with FIG. 3, in some implementations, inference module 118 may also process additional inputs 451 (which correspond to additional inputs 351 in FIG. 3) at various stages of the prediction process, as shown by the arrows in FIG. 4.

Both top-down images 442A and side view images 442B are processed by inference module 118 using the same extraction portion 444 to generate a plurality of embeddings 446. Some embeddings may correspond to top down images 442A and others may correspond to side view images 442B. Combination module 448 may combine these embeddings as described previously, e.g., using concatenation, averaging, etc., to generate a single unified representation 450 of both top-down images 442A and side view images 442B. Unified representation 450 may be processed by inference module 118 using prediction portion 452 to generate, as direct output of prediction portion 452, an aggregate trait estimate 422. Unlike in FIG. 3, no function g( . . . ) is used to generate a final aggregate trait estimate.

Figure 5:
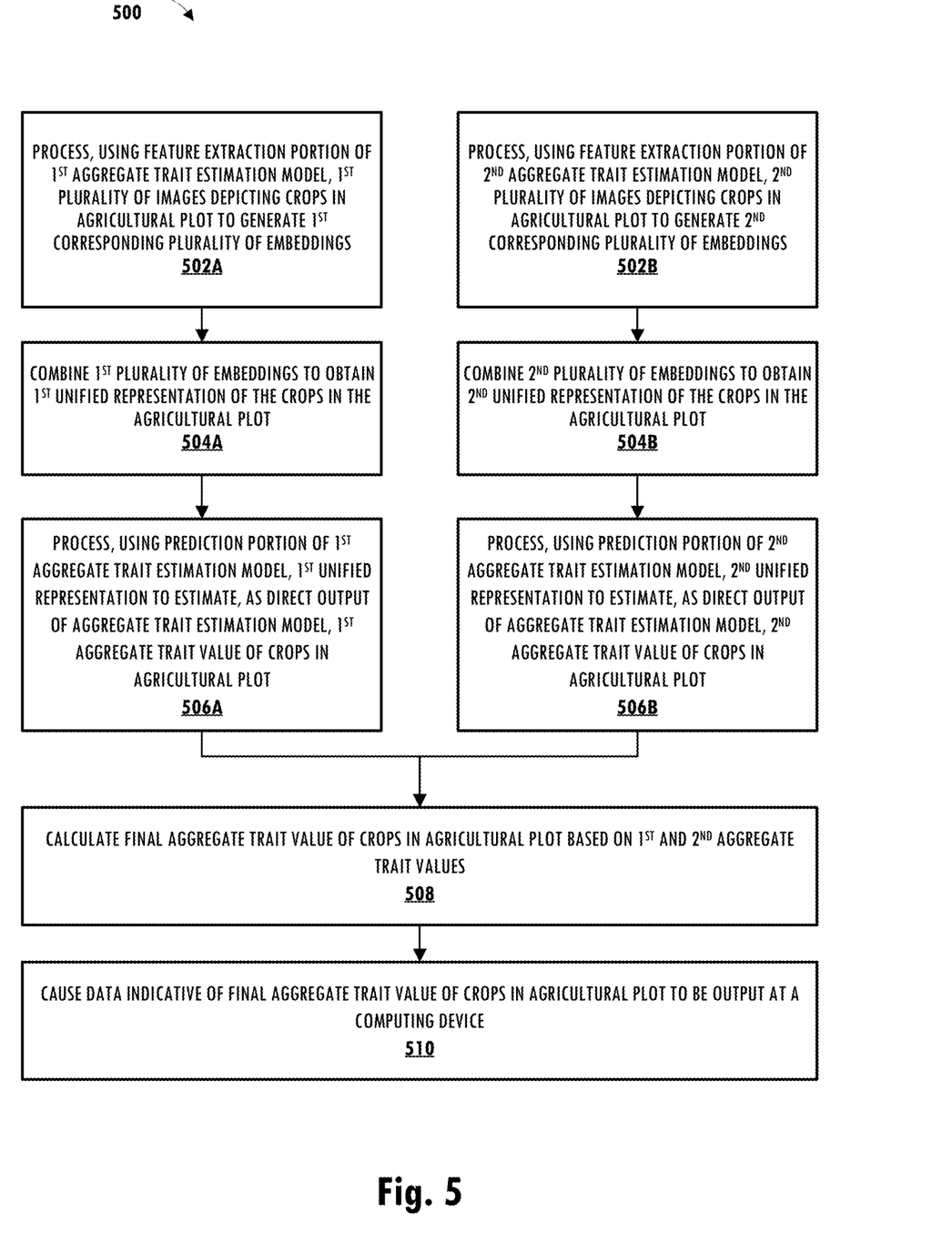
FIG. 5 is a flowchart of an example method in accordance with various implementations described herein.

FIG. 5 illustrates a flowchart of an example method 500 for practicing selected aspects of the present disclosure during an inference phase. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

Similar to FIG. 3, in FIG. 5, multiple different vision sensors captured images of the plot's crops from multiple different angles. Consequently, there are, in effect, two parallel pipelines of method 500. However, it is not required to obtain images of crops in a plot from multiple angles, in which case one pipeline may be omitted, and block 508 may also be omitted. Additionally, even where images are captured from multiple angles, it is also possible to process them in a single pipeline, as demonstrated in FIG. 4.

At block 502A, the system, e.g., by way of inference module 118, may process, e.g., using feature extraction portion 344A of an aggregate trait estimation model, a plurality of images (e.g., 342A) captured from a first angle and depicting crops in an agricultural plot to generate a corresponding plurality of embeddings (e.g., 346A). Likewise, at block 502B, the system, e.g., by way of inference module 118, may process, e.g., using feature extraction portion 344B of the aggregate trait estimation model, another plurality of images (e.g., 342B) captured from a second angle and depicting the crops in the agricultural plot to generate another corresponding plurality of embeddings (e.g., 346B).

At block 504A, the system, e.g., by way of combination module 348, may combine the first plurality of embeddings (e.g., 346A) to obtain a first unified representation (e.g., 350A) of the crops in the agricultural plot. Likewise, at block 504B, the system, e.g., by way of combination module 348, may combine the second plurality of embeddings (e.g., 346B) to obtain second unified representation (e.g., 350A) of the crops in the agricultural plot.

At block 506A, the system, e.g., by way of inference module 118, may process, using a prediction portion (e.g., 352A) of the first aggregate trait estimation model, the first unified representation (e.g., 350A) of the crops to estimate, as a direct output of the first aggregate trait estimation model, a first aggregate trait value of the crops in the agricultural plot. Likewise, at block 506B, the system, e.g., by way of inference module 118, may process, using a prediction portion (e.g., 352B) of the second aggregate trait estimation model, the second unified representation (e.g., 350B) of the crops to estimate, as a direct output of the second aggregate trait estimation model, a second aggregate trait value of the crops in the agricultural plot.

At block 508, the system may calculate a final aggregate trait value of crops in the agricultural plot based on the first and second aggregate trait values calculated at blocks 506A and 506B, respectively. As noted above, this may include averaging, weighted averaging (e.g., based on confidence measures, image quality, etc.), and/or other types of statistical combination.

At block 510, the system may cause data indicative of the estimated aggregate trait value of the crops in the agricultural plot to be output at a computing device. For example, a crop yield prediction may be presented to a user audibly or visually at AG client 107 of client device 106-1. In some implementations, a user may operate AG client 107 to view per-plot aggregate trait value estimates, such as crop yields. Presenting an overhead map that shows predicted crop yields may allow a grower to ascertain areas of a farm that need remediation because their predicted yields are outside of expectations. For example, plots that are overhydrated, infested with pests or disease, lack sufficient nutrients, have poor quality soil, etc., may have relatively low crop yield predictions. In some implementations, AG client 107 may calculate a total crop yield of a farm or other interest by adding up all of the aggregate trait values for all the individual plots of the farm.

In some implementations, aggregate trait estimation models configured with selected aspects of the present disclosure may be leveraged to enable aggregate trait estimation using different types of images than were used to train the aggregate trait estimation models. For instance, the aggregate trait estimation models described with reference to FIGS. 3 and 4 operated on ground-based imagery captured by a land-based rover (308), which operates on the ground, in close enough proximity to plants that its vision sensors (e.g., 340A-B) can capture myriad predictive features (latent and otherwise) of crops.

However, if other images of the same plots are captured at the same time (or at least within a short enough time interval that the crops will not have undergone any meaningful changes visually) by another type of device, such as UAV 108-1, these other images may be correlated to the same aggregate traits predicted using the ground-based imagery captured by the rover. For example, a high-elevation aggregate trait estimation model may be trained to map images captured by UAV 108-1 to the same crop yields predicted using images captured contemporaneously by the ground-based rover. Even though these higher elevation images may not include all the visual features (latent and otherwise) that were contained in the ground-based imagery, the high-elevation aggregate trait estimation model may be trained to "learn" other visual features of these higher elevation images that may or may not be present in the ground-based imagery.

Figure 6:
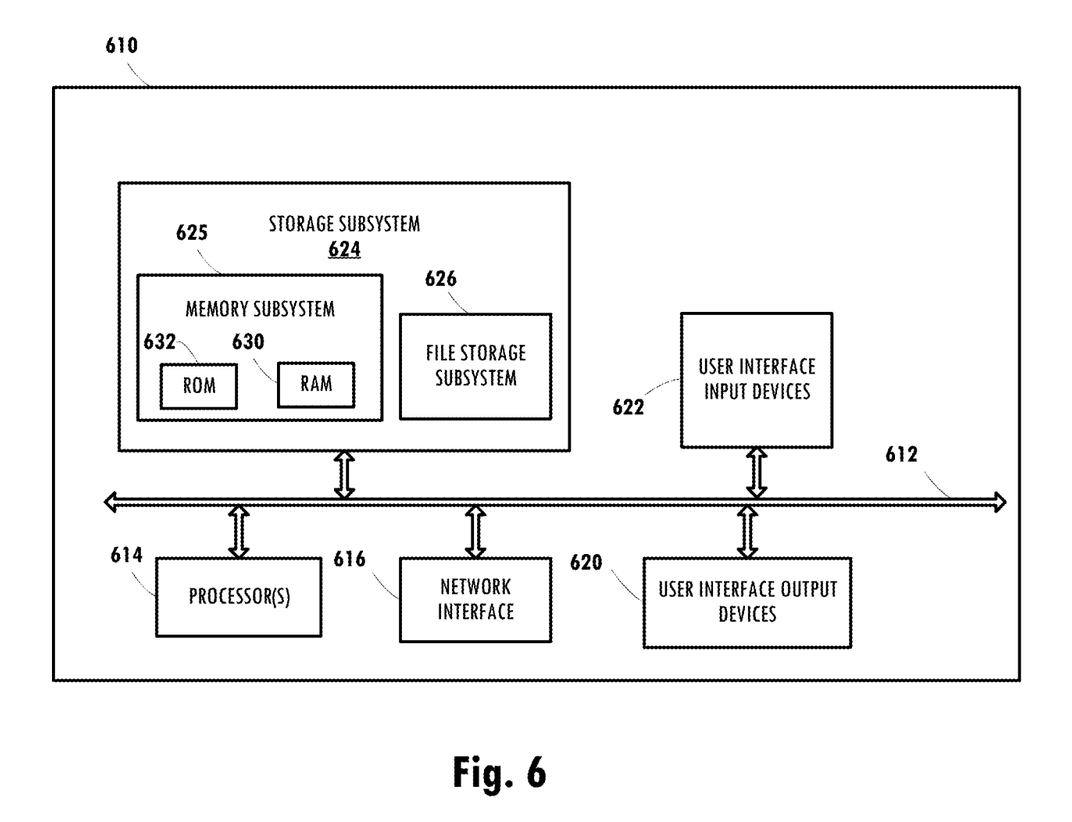
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 400 described herein, as well as to implement various components depicted in FIGS. 1-4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
processing, using a feature extraction portion of a first aggregate trait estimation model, a first plurality of images depicting crops in an agricultural plot to generate a corresponding first plurality of embeddings;
processing, using a feature extraction portion of a second aggregate trait estimation model, a second plurality of images to generate a corresponding second plurality of embeddings;
combining the first plurality of embeddings to obtain a first unified representation of the crops in the agricultural plot;
combining the second plurality of embeddings to obtain a second unified representation of the crops in the agricultural plot;
processing, using prediction portions of the first and second aggregate trait estimation models, the first and second unified representations of the crops to estimate an aggregate trait value of the crops in the agricultural plot; and
causing data indicative of the estimated aggregate trait value of the crops in the agricultural plot to be output at a computing device.

2. The method of claim 1, further including capturing the first plurality of images using a first vision sensor carried across the agricultural plot by an agricultural vehicle.

3. The method of claim 2, further including capturing the second plurality of images using a second vision sensor carried across the agricultural plot by the agricultural vehicle, wherein the first vision sensor captures the crops from a first angle and the second vision sensor captures the crops from a second angle that is different than the first angle.

4. The method of claim 3, wherein the first angle includes a side view of the crops and the second angle comprises a top-down view of the crops.

5. The method of claim 3, wherein the aggregate trait value is a final aggregate trait value, and the method further includes:
processing, using the prediction portion of the first aggregate trait estimation model, the first unified representation of the crops to estimate a first aggregate trait value of the crops in the agricultural plot; and
processing, using the prediction portion of the second aggregate trait estimation model, the second unified representation of the crops to estimate a second aggregate trait value of the crops in the agricultural plot.

6. The method of claim 5, further including calculating the final aggregate trait value of the crops in the agricultural plot based on the first and second aggregate trait values.

7. The method of claim 1, wherein the combining includes concatenating or averaging the first plurality of embeddings.

8. The method of claim 1, wherein the estimated aggregate trait value includes a probability within a normalized range that corresponds to non-normalized, ground truth aggregate trait values observed in a plurality of fields.

9. A system comprising one or more processors and memory storing instructions that, in response to execution of the instructions, cause the one or more processors to:
process, using a feature extraction portion of a first aggregate trait estimation model, a first plurality of images depicting crops in an agricultural plot to generate a corresponding first plurality of embeddings;
process, using a feature extraction portion of a second aggregate trait estimation model, a second plurality of images to generate a corresponding second plurality of embeddings;
combine the first plurality of embeddings to obtain a first unified representation of the crops in the agricultural plot;
combine the second plurality of embeddings to obtain a second unified representation of the crops in the agricultural plot;
process, using prediction portions of the first and second aggregate trait estimation models, the first and second unified representations of the crops to estimate an aggregate trait value of the crops in the agricultural plot; and
cause data indicative of the estimated aggregate trait value of the crops in the agricultural plot to be output at a computing device.

10. The system of claim 9, further including instructions to capture the first plurality of images using a first vision sensor carried across the agricultural plot by an agricultural vehicle.

11. The system of claim 10, further including instructions to capture the second plurality of images using a second vision sensor carried across the agricultural plot by the agricultural vehicle, wherein the first vision sensor captures the crops from a first angle and the second vision sensor captures the crops from a second angle that is different than the first angle.

12. The system of claim 11, wherein the first angle includes a side view of the crops and the second angle comprises a top-down view of the crops.

13. The system of claim 11, wherein the aggregate trait value is a final aggregate trait value, and the memory includes instructions to:
process, using the prediction portion of the first aggregate trait estimation model, the first unified representation of the crops to estimate a first aggregate trait value of the crops in the agricultural plot; and
process, using the prediction portion of the second aggregate trait estimation model, the second unified representation of the crops to estimate a second aggregate trait value of the crops in the agricultural plot.

14. The system of claim 13, further including instructions to calculate the final aggregate trait value of the crops in the agricultural plot based on the first and second aggregate trait values.

15. The system of claim 9, wherein the first plurality of embeddings are combined by concatenation or averaging.

16. The system of claim 9, wherein the estimated aggregate trait value includes a probability within a normalized range that corresponds to non-normalized, ground truth aggregate trait values observed in a plurality of fields.

17. A non-transitory computer-readable medium comprising instructions that, in response to execution of the instructions by a processor, cause the processor to:
process, using a feature extraction portion a first aggregate trait estimation model, a first plurality of images depicting crops in an agricultural plot to generate a corresponding first plurality of embeddings;
process, using a feature extraction portion of a second aggregate trait estimation model, a second plurality of images to generate a corresponding second plurality of embeddings;

combine the first plurality of embeddings to obtain a first unified representation of the crops in the agricultural plot;

combine the second plurality of embeddings to obtain a second unified representation of the crops in the agricultural plot;

process, using prediction portions of the first and second aggregate trait estimation models, the first and second unified representations of the crops to estimate an aggregate trait value of the crops in the agricultural plot; and cause data indicative of the estimated aggregate trait value of the crops in the agricultural plot to be output at a computing device.

18. The non-transitory computer-readable medium of claim 17, further including instructions to capture the first plurality of images using a first vision sensor carried across the agricultural plot by an agricultural vehicle.

19. The non-transitory computer-readable medium of claim 18, further including instructions to capture the second plurality of images using a second vision sensor carried across the agricultural plot by the agricultural vehicle, wherein the first vision sensor captures the crops from a first angle and the second vision sensor captures the crops from a second angle that is different than the first angle.

20. The non-transitory computer-readable medium of claim 19, wherein the first angle includes a side view of the crops and the second angle comprises a top-down view of the crops.

* * * * *